United States Patent Office 3,011,996
Patented Dec. 5, 1961

3,011,996
PROCESS OF REACTING A TERTIARY AMINE WITH A HALOGENATED COPOLYMER OF AN ISOOLEFIN MONOMER AND A MULTIOLEFIN MONOMER, AND PRODUCT THEREOF
Irving Kuntz, Roselle Park, and Francis P. Baldwin, Colonia, N.J., assignors to Esso Research and Engineering Company, a corporation of Delaware
No Drawing. Filed Apr. 15, 1957, Ser. No. 652,696
11 Claims. (Cl. 260—41.5)

This invention relates to the modification of rubbery halogenated copolymers of isoolefins and multiolefins, particularly chlorinated or brominated butyl rubber with certain tertiary amines.

Butyl rubber copolymers comprise a major proportion (preferably about 85 to 99.5 weight percent) of a $C_4$ to $C_8$ isoolefin such as isobutylene, 2-methyl-1-butene or 3-methyl-1-butene, etc., with a minor proportion (preferably about 15 to 0.5 weight percent) of a multiolefin of about 4 to 14, preferably about 4 to 6 carbon atoms and are commonly referred to in patents and technical literature as "butyl rubber," or GR-I rubber (Government Rubber-Isobutylene), for example in textbook "Synthetic Rubber" by G. S. Whitby. The preparation of butyl rubber is described in U.S. Patent 2,356,128 to Thomas et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, allo-ocymene, vinyl fulvenes, etc. The copolymer comprising isobutylene and isoprene is preferred, although the copolymer may contain about 0.05 to 20.0, preferably about 0.2 to 5.0 parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc. Such a copolymer has a Staudinger molecular weight between about 20,000 and 300,000, or a viscosity average molecular weight of about 250,000 to 2,000,000 and a mole percent unsaturation between about 0.5 and 15.0.

In accordance with the present invention, it has now been found that rubbery halogenated isoolefin-multiolefin copolymers such as butyl rubber may be modified by minor proportions of heterocyclic tertiary amines to form thermoplastic materials which may be molded into products having high tensile strengths without the need of added curatives. Such high tensile strength materials may be produced by heating the modified copolymer at a temperature level of between about 80° and 450° F. for between about 0.5 minute and 5 hours.

The halogenated rubbery isoolefin-multiolefin copolymers are produced by carefully chlorinating or brominating these copolymers in a manner which does not substantially degrade the molecular weight thereof. More particularly, in producing halogenated butyl rubber, the halogenation is regulated so that the resulting rubber will contain at least about 0.5 weight percent (preferably at least about 1.0 weight percent) combined halogen but not more than about "X" weight percent combined chlorine or 3.0 "X" weight percent combined bromine wherein:

$$X = \frac{M_3 L}{(100-L)M_1 + L(M_2+M_3)} \times 100$$

and

L = mole percent of the multiolefin in the polymer,
$M_1$ = molecular weight of the isoolefin,
$M_2$ = molecular weight of the multiolefin,
$M_3$ = atomic weight of chlorine or bromine.

Suitable halogenating agents which may be employed are gaseous chlorine, liquid bromine, alkali metal hypochlorites or hypobromites, $C_4$ to $C_{10}$ tertiary alkyl hypochlorites, sulfur bromides, sulfuryl chloride, pyridinium chloride perchloride, N-bromosuccinimide, alpha-chloroaceto-acetanilide, N,N′-dichloro-5,5 - dimethylhydantoin, iodine halides, trichlorophenol chloride, N-chloroacetamide, beta-bromomethyl phthalimide, etc. The preferred halogenating agents are gaseous chlorine, liquid bromine, sulfuryl chloride, sulfuryl bromide, chloro-hydantoins, bromo-hydantoins, iodine monochloride, and related materials.

The halogenation is generally conducted at temperatures of above about 0° to about +100° C., depending upon the particular halogenating agent, for about one minute to several hours. An advantageous pressure range is from about 0.1 to 1000 p.s.i.a., atmospheric pressure being satisfactory. The halogenation may be accomplished preferably by preparing a 1 to 80 weight percent solution of such copolymers as above, in a substantially inert liquid organic solvent such as a $C_5$ to $C_{10}$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc. and adding thereto the halogenating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the rubbery copolymer and dried under about 1 to 760 millimeters or higher of mercury pressure absolute at about 0° to 180° C., preferably about 50° to 150° C. (e.g. 70° C.). Other methods of recovering the chlorinated polymer are by conventional spray or drum drying techniques. Alternatively, the solution of the halogenated butyl rubber may be injected into a vessel containing steam and/or agitated water heated to a temperature sufficient to volatilize the solvent and form an aqueous slurry of the halogenated butyl rubber. This halogenated butyl rubber may then be separated from the slurry by filtration and drying and recovered as a "crumb" or as a dense sheet or slab by conventional hot milling and/or extruding procedures. As so produced the halogenated rubbery copolymer has a Staudinger molecular weight within the range of approximately 20,000 to 300,000 preferably about 25,000 to 200,000, and a mole percent unsaturation of about 0.5 to 15.0.

In practicing the present invention, the resulting unvulcanized halogenated isoolefin-multiolefin-containing copolymer is reacted at a temperature level of between about 0° and 150° C., preferably between about 40° and 100° C. for about 10 minutes to 50 hours, preferably for about 1 to 30 hours with about 0.1 to 100, preferably about 5.0 to 75 parts by weight, per 100 parts by weight of halogenated copolymer, of certain tertiary amines, optionally in the presence of about 0.01 to 5.0 weight percent based on copolymer of a Lewis acid-type catalyst such as zinc chloride, mercuric chloride, silver nitrate, or the like. For the purposes of the present invention, the tertiary amine may be a heterocyclic tertiary amine which is preferably pyridine or a substituted pyridine of the general formula:

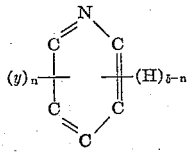

in which $y$ is selected from the group consisting of R, OR and OH; R being selected from the group consisting of $C_1$ to $C_{20}$ alkyl, cycloalkyl, aryl, aralkyl and alkaryl; $n$ being an integer of between about 0 and 3.

Typical tertiary amines, useful for the purposes of the present invention include, among others; 1-azabicyclo (2.2.2.)octane; isoquinoline; 1,5-diazacyclo-decapentaene; 1-azabicyclo(3.3.1)nonane, $\alpha,\alpha'$-bipyridyl and especially pyridine. The resulting reaction products formed have utility as rubber insulation, in proofed goods, tires, etc.

In order to more fully illustrate the present invention, the following experimental data are given.

CHLORINATED BUTYL RUBBER "A"

A copolymer of about 97% isobutylene and 3% isoprene having a viscosity average molecular weight of 320,000 was dissolved in hexane to form a 10% solution. To this polymer solution, a 20 weight percent (based on the polymer) of liquid sulfuryl chloride as the chlorinating agent was added at room temperature. The resulting chlorinated interpolymer was precipitated with acetone, collected and redissolved in hexane three times and ultimately dried and analyzed and found to have a viscosity average molecular weight of 320,000 and to contain 1.4% chlorine. The physical characteristics of both zinc oxide and diamine-cured vulcanizates, containing this chlorinated interpolymer, were excellent.

CHLORINATED RUBBERS "B" TO "L"

Other examples of halogenated isoolefin-multiolefin copolymers are as follows, the amount of isoolefin and multiolefin in copolymer, halogenation agent, and amount of halogen combined in the copolymer being tabulated hereinafter:

The chlorine was added to the reactor through the conduit via the sparger ring. The chlorination was then terminated and the solution containing the chlorinated butyl rubber formed was agitated for an additional 10 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

|  | Pounds added | Percent in the final polymer |
|---|---|---|
| Butyl rubber | 170 | 98.78 |
| Benzene solvent | 1,540 | |
| Chlorine | 4.8 (i.e. 2.8%) | 1.22 |

The resulting water-washed solution containing chlorinated rubbery butyl rubber "M" was then injected into 6140 lbs. of an agitated aqueous solution containing 0.5 weight percent based on chlorinated butyl rubber of an aliphatic polyoxyethylene ether type wetting agent (i.e. Sterox AJ), the temperature being maintained at a level of between about 190° and 210° F. (e.g. 200° F.) whereby to flash off the benzene solvent and form an aqueous slurry of the chlorinated butyl rubber in water. This slurry was then filtered, and the chlorinated butyl rubber, which was in the form of a wet "crumb," was placed in a Proctor and Schwartz tray drier maintained at 180° F. (i.e., 82° C.) and dried for ten hours. The crumb depth on the tray was about ½ inch. The crumb was then completely dried and compacted by milling for 10 minutes on a conventional rubber mill having a roll temperature of 260° F. (i.e. 127° C.).

Example I 400 grams of chlorinated butyl rubber "M" were dissolved in 4000 cc. of chloroform. To this solution were added 1 gram of zinc chloride in 50 cc. of moist acetone followed by 200 cc. of pyridine. The reaction mixture was then heated at 50 to 60° C. for 26 hours. The modified product formed was isolated and any unreacted pyridine removed by running the reaction mixture slowly into a large volume of boiling water. The modified prod-

| Halogenated | Isoolefin (%)[1] | Multiolefin (%)[1] | Halogenation Agent | (%) Halogen in the rubber[1] |
|---|---|---|---|---|
| B | Isobutylene (98) | Isoprene (2) | $SO_2Cl_2$ | 1.2 chlorine. |
| C | Isobutylene (95) | Isoprene (5.0) | $Cl_2$ in $CCl_4$ | 2.5 chlorine. |
| D | Isobutylene (94) | Cyclopentadiene (6) | $Cl_2$ in $CCl_4$ | 2.0 chlorine. |
| E | Isobutylene (92) | Myrcene (8.0) | $Cl_2$ in $CCl_4$ | 1.6 chlorine. |
| F | 2-methylbutene-1 (95) | Isoprene (5) | $Cl_2$ in Hexane | 1.5 chlorine. |
| G | 3-methylbutene-1 (96) | Butadiene (4) | $Cl_2$ in Hexane | 1.9 chlorine. |
| H | Isobutylene (98) | 1-vinyl cyclohexene-3 (2) | $Cl_2$ in $CCl_4$ | 0.8 chlorine. |
| I | Isobutylene (92) | Butadiene (8) | Gaseous chlorine | 2.8 chlorine. |
| J | Isobutylene (85) | Isoprene (15) | Gaseous chlorine | 6.6 chlorine. |
| K | Isobutylene (98) | Isoprene (2) | N,N'-dichloro-5,5-dimethyl hydantoin | 1.1 chlorine. |
| L | Isobutylene (98) | Isoprene (2) | Liquid bromine | 2.3 bromine. |

[1] NOTE.—(%) in all instances is percent by weight.

CHLORINATED BUTYL RUBBER "M"

An additional run was made chlorinating a commercial rubber having a Mooney viscosity at 212° F. for 8 minutes of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of ½ hour at a temperature level of 30° C. and under atmospheric pressure.

uct was collected by filtration, air dried, and finally dried by hot milling on a rubber mill at 250° to 260° F. for 10 minutes and was found to contain 0.025% nitrogen.

A sample of the modified product was molded at 275° F. for 15 minutes and then placed in a cold press for 10 minutes. A portion of 0.014 inch thickness was found to have the following physical properties:

Tensile strength (p.s.i.) _____ 4650
Elongation (percent) _____ 700

The above data show that pyridine modified chlorinated butyl rubber can be molded into a product of high tensile strength and elongation without the need of added curatives. However, the molded specimen was found to be soluble in chloroform indicating the absence of permanent immutable chemical cross links. This is in sharp contrast to the behavior of such a polymer after heating in the presence of curvatives where permanent cross links are formed and the material will swell but not dissolve in the solvent.

*Example II*

100 parts by weight of the modified product of Example I were compounded with 50 parts by weight of silica and 40 parts by weight of titanium dioxide. The compounded material was molded under 800 p.s.i. pressure at 275° F. for 15 minutes and then transferred to a cold press and allowed to cool for 10 minutes at room temperature. Physical inspections resulting from a test specimen cut from the molded sheet were as follows:

Tensile strength (p.s.i.) _____ 880
Elongation (percent) _____ 225
Modulus at 100% elong. (p.s.i.) _____ 500

Unmodified chlorinated butyl rubber, molded as above, would have a tensile strength of less than 200 p.s.i.

*Example III*

The same general procedure as in Example II was repeated replacing the silica with SRF carbon black and omitting the titanium dioxide with the following results:

Tensile strength (p.s.i.) _____ 1030
Elongation (percent) _____ 535
Modulus at 100% elong. (p.s.i.) _____ 240

The above data show that in carbon black reinforced compounds, the pyridine modified product has useful tensile and elongation properties.

*Example IV*

100 grams of a brominated butyl rubber having a Mooney viscosity (212° F. for 8 minutes) of 50 and a bromine content of 2.7 weight percent based on butyl rubber, were dissolved in 1,000 cc. of chloroform. This solution was reacted with 49 grams of pyridine at 60° C. for 17 hours. The modified product formed was isolated and recovered as in Example I. Analysis of the product indicated 0.48% nitrogen. A sample of this material was molded at 275° F. for 15 minutes and then in a cold press for 10 minutes. A specimen of 0.015 inch thickness was found to have the following physical properties:

Tensile strength (p.s.i.) _____ 1380
Elongation (percent) _____ 550

The above data show that pyridine modified brominated butyl rubber molds into a product of good tensile strength and elongation without the need of added curatives.

*Example V*

100 parts by weight of the modified product of Example I were compounded with 50 parts by weight of SRF carbon black, 5 parts by weight of zinc oxide, 2 parts by weight of sulfur, and 1 part by weight of tellurium diethyl dithiocarbamate and cured for 40 minutes at 307° F., the resulting vulcanizate exhibiting the following physical inspections:

Tensile strength (p.s.i.) _____ 1280
Elongation (percent) _____ 285
Modulus at 100% elong. (p.s.i.) _____ 390

The above data show that pyridine-modified chlorinated butyl rubber cures into a product of good physical properties in the presence of conventional butyl rubber curatives. It has further been found that the pyridine-modified chlorinated butyl rubber of the present invention may be cured solely by zinc oxide or covulcanized, particularly in the presence of sulfur, with about 5 to 95 weight percent based on total rubber of such other rubbery materials as unmodified butyl rubber, natural rubber, rubbery diene-styrene copolymers, rubbery diene-nitrile copolymers, mixtures thereof, etc. For vulcanization or covulcanization in the presence of sulfur, it is preferred to cure the resulting composition at about 200° to 450° F., preferably at about 250° to 400° F. for between about 0.5 and 90 minutes depending on the temperature employed.

Resort may be had to modifications and variations of the disclosed embodiments without departing from the spirit of the invention or the scope of the appended claims.

What is claimed is:

1. A vulcanizate which comprises the reaction product of 100 parts by weight of a halogenated copolymer of 85 to 99.5 wt. percent of an isoolefin and 15 to 0.5 wt. percent of a multiolefin, said copolymer having a mole percent unsaturation of about 0.5–15.0 and containing at least 0.5 wt. percent but not more than one combined atom of halogen per double bond in the polymer, said halogen being selected from the group consisting of chlorine, bromine, and iodine, and 5 to 75 parts by weight of a heterocyclic tertiary amine having the formula:

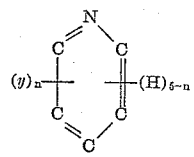

in which $y$ is selected from the group consisting of R, OR and OH; R being selected from the group consisting of $C_1$ to $C_{20}$ alkyl, cycloalkyl, aryl, aralkyl and alkaryl, $n$ being an integer of between about 0 and 3, said reaction product having been cured to provide a vulcanizate having increased tensile strength.

2. A composition according to claim 1 in which the halogenated copolymer contains at least about 0.5 weight percent chlorine but not more than about 1 combined atom of chlorine per double bond in the copolymer.

3. A composition according to claim 1 in which the halogenated copolymer contains at least about 0.5 weight percent bromine but not more than about three combined atoms of bromine per double bond in the copolymer.

4. A composition according to claim 1 which has been molded in the absence of curatives at a temperature level of between about 80° and 450° F. until it exhibits a tensile strength of at least about 800 p.s.i.

5. A process for modifying a halogenated copolymer of 85 to 99.5 wt. percent of an isoolefin and a 15 to 0.5 wt. percent of a multiolefin, said copolymer having a mole percent unsaturation of about 0.5 to 15.0 and containing at least 0.5 wt. percent but not more than one combined atom of halogen per double bond in the polymer, said halogen being selected from the group consisting of chlorine, bromine, and iodine, which comprises reacting 100 parts by weight of said halogenated copolymer at a temperature level of between about 0° and 150° C. with 5 to 75 parts by weight of a heterocyclic tertiary amine having the formula:

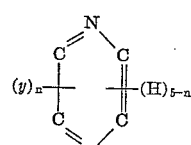

in which $y$ is selected from the group consisting of R, OR and OH; R being selected from the group consisting of $C_1$ to $C_{20}$ alkyl, cycloalkyl, aryl, aralkyl and alkaryl, $n$ being an integer of between about 0 and 3, to provide a product therefrom which is capable of being cured to a unitary vulcanizate.

6. A process according to claim 5 in which the resulting modified, halogenated copolymer is subsequently molded at a temperature level of between about 80° and 450° F. until a material having a tensile strength of at least about 800 p.s.i. is produced.

7. A molded thermoplastic vulcanizate having a tensile strength of at least about 800 p.s.i. containing the reaction product of a halogenated copolymer of 85 to 99.5 wt. percent of an isoolefin and 85 to 0.5 wt. percent of a multiolefin, said copolymer having a mole percent unsaturation of 0.5 to 15.0 and containing at least 0.5 wt. percent but not more than one combined atom of halogen per double bond in the polymer, said halogen being selected from the group consisting of chlorine, bromine, and iodine and a heterocyclic tertiary amine having the formula:

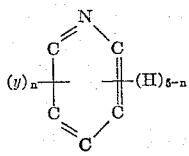

8. A product according to claim 7 in which the amine is pyridine.

9. A vulcanized product having an elongation of about 200 to 600% and an extension modulus at 100% elongation of between about 200 and 600 p.s.i., said product comprising an admixture of at least one inorganic filler and the reaction product of a halogenated copolymer of 85 to 99.5 wt. percent of an isoolefin and 15 to 0.5 wt. percent of a multiolefin, said copolymer having a mole percent unsaturation between about 0.5 to 15.0 and containing at least 0.5 wt. percent but not more than one combined atom of halogen per double bond in the polymer, said halogen being selected from the group of chlorine, bromine, and iodine and a heterocyclic tertiary amine having the formula:

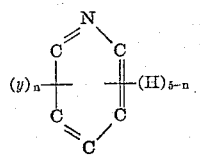

10. A vulcanizate comprising the reaction product of 100 parts by weight of a chlorinated copolymer of 85 to 99.5 wt. percent of an isobutylene and 15 to 0.5 wt. percent of isoprene, said copolymer having a mole percent unsaturation of about 0.5 to 15.0 and containing about 0.5 to about 2.8 percent chlorine with about 5 to 75 parts by weight of pyridine, said reaction product having increased tensile strength.

11. The process which comprises reacting 100 parts by weight of a chlorinated copolymer of 85 to 99.5 wt. percent of an isobutylene of 15 to 0.5 wt. percent of isoprene, said copolymer containing about 0.5 to about 2.8 percent chlorine with 5 to 75 parts by weight of pyridine at a temperature of about 0° to 150° C. for about ten minutes to fifty hours to provide a reaction product which is capable of being cured to a unitary vulcanizate.

References Cited in the file of this patent

UNITED STATES PATENTS

| | | |
|---|---|---|
| 2,451,174 | Reuter | Oct. 12, 1948 |
| 2,476,832 | Donia | July 19, 1949 |
| 2,804,448 | Hallenbeck | Aug. 27, 1957 |
| 2,860,118 | Nagelschmidt et al. | Nov. 11, 1958 |